United States Patent Office 2,997,981
Patented Aug. 29, 1961

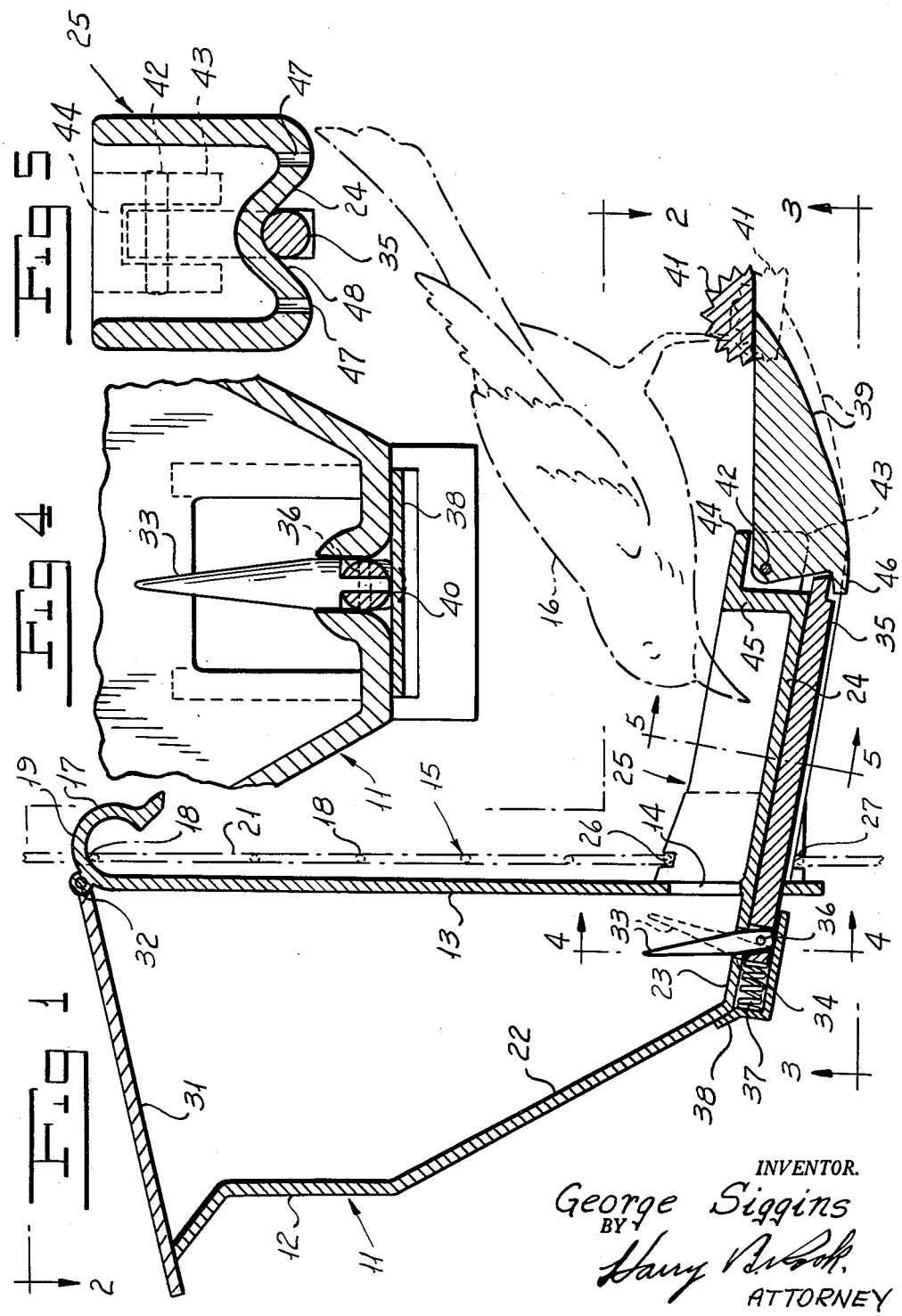

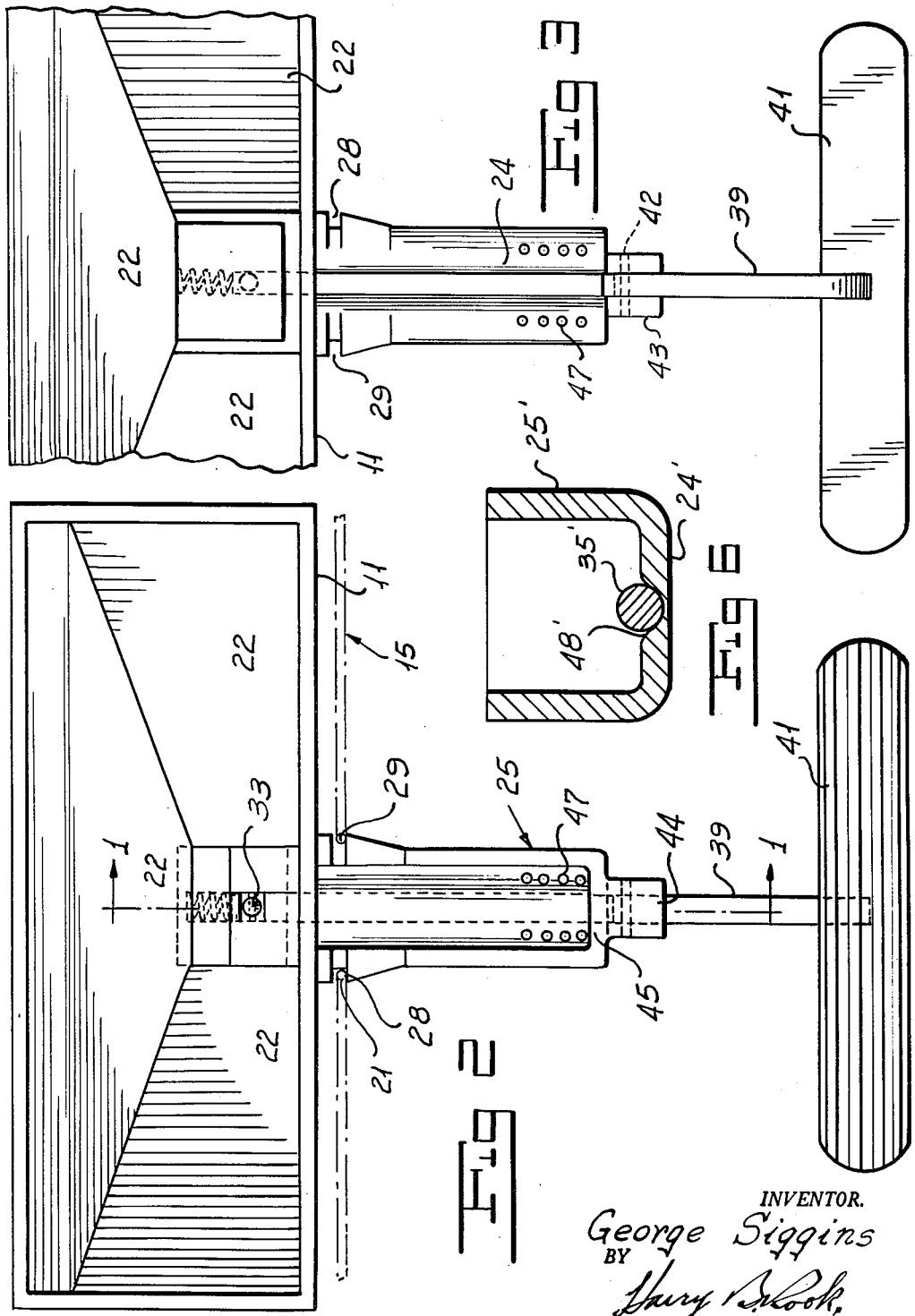

2,997,981
FEED HOPPER AND DISPENSING DEVICE
George Siggins, 8 Elmwood Drive, Livingston, N.J.
Filed Apr. 5, 1960, Ser. No. 20,191
12 Claims. (Cl. 119—55)

This invention relates to a novel hopper and dispenser device for the feeding of birds, particularly caged birds, although features of the invention may be employed in the feeding of other animals or in the general dispensing of materials or particles from a container.

In using an ordinary bird seed container or hopper, one has to rely on gravity to get the seed to a trough or other feeding device. When relying on gravity, there is a tendency for the seed or other feed to clog at the feed exit, or aperture through which the feed flows to a trough, such an exit being the critical part or bottleneck of the feeder.

In accordance with my invention, I overcome this trouble by the use of an agitator that breaks up any clogging and is movable forward and backward about a pivot near its lower end. The usual bird seed hopper has to be placed in front of a stationary perch, if used for feeding a caged bird. In accordance with my invention, I have a perch as a part of the dispensing device, so that it can be placed in any part of the cage.

A bird seed hopper trough is usually filled up with dust-like particles by the bird in the process of removing the hulls for eating the seed. I eliminate such debris by having small holes in the bottom of the trough of my device as well as having the trough inclined downwardly and toward the interior of the cage, so that the feed rolls along, causing the small particles to fall to the bottom and out through the holes in the bottom wall and onto the floor of the cage. Also, in accordance with my invention, I can fill the hopper without disengaging it from the cage. I may prevent seed hulls from falling outside by having a skirt extending along the outside of the cage and below the trough. If desired, a box of seed may be placed in the hopper and the contents thereof dispensed directly therefrom.

An object of my invention is to provide a bird feeder with a trough extending, from an exit in the wall of the container which lies adjacent the cage, diagonally downward from the outer surface of said wall and into said cage, so that a bird therein may have access to feed in said trough, said trough having small apertures in its lower wall to screen debris from the seed as it is used.

Another object of my invention is to provide a bird feeder in which the trough for feeding seed to a bird has lugs depending from the extreme end thereof, with a perch bar straddled thereby, pivoted thereto, and its motion limited by trough engagement.

A further object of my invention is to provide such a perch bar at its pivoted or perch-remote end with a lip, have a slide rod with its adjacent end resting on said lip, and a barrier-agitator passing through a hole in the lower wall of the feed hopper and pivoted with respect to the other end of said rod, with spring means engaging said other end to cause said rod to lie in its position most remote from the hopper, to raise the perch bar to its highest level for operating by the bird alighting on said bar or a perch mounted on its free end.

A still further object of my invention is to provide a perch bar for operating an agitator, spring moved in one direction when the weight of a bird or other animal does not push down the perch bar, the strength of said spring being such that it is overcome by the weight of said bird upon alighting on the perch bar, whereby said rod is moved in the opposite direction to agitate the feed in the hopper.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is a vertical sectional view of a feed hopper and dispensing device embodying my invention on the line 1—1 of FIGURE 2, in the direction of the arrows, FIGURE 2 is a top plan view of the seed hopper and dispensing device, as on the line 2—2 of FIGURE 1, in the direction of the arrows, FIGURE 3 is a bottom plan view of the device, as on the line 3—3 of FIGURE 1, in the direction of the arrows, FIGURE 4 is an enlarged fragmentary vertical sectional view, on the line 4—4 of FIGURE 1, in the direction of the arrows, FIGURE 5 is an enlarged transverse sectional view, on the line 5—5 of FIGURE 1, in the direction of the arrows, and FIGURE 6 is an enlarged transverse sectional view, corresponding to FIGURE 5 but showing another embodiment of my invention.

Referring to the drawings in detail, and first considering the embodiment of my invention illustrated in FIGURES 1 to 5, inclusive, there is shown a seed hopper 11, formed as a four-sided container tapering at some portions from top to bottom and presenting a generally inverted frusto-pyramidal appearance. However, as will be seen, particularly from FIGURES 1 to 2, the intermediate portion of the container preferably has normally vertical sides forming a generally rectangular section 12. From the section 12, one wall only, that is, the one designated 13, extends normally vertically and terminates near its lower end in an exit opening 14. This wall 13 is the one which normally lies against or near the cage 15, in which a bird 16 or other animal is enclosed. Said wall 13 is desirably provided with a hook 17 which may hang on one of the horizontal elements or wires 18 forming the cage 15. Said hook desirably has notches 19 in its sides, each of which is adapted to receive a vertical element or wire 21 of the cage.

The other walls 22 of the hopper, below the rectangular section 12, desirably slopes diagonally downward and inward toward the bottom wall 23. The latter serves as a continuation of the bottom wall 24 of a feeding trough 25, which trough is received between the bars or wires of the cage 15 and extends diagonally downward thereinto, as viewed most clearly in FIGURE 1. This trough 25 desirably has upper and lower notches 26 and 27, respectively, to receive horizontal elements 18 of the cage, and side notches 28 and 29 to receive vertical elements 21 of the cage, whereby the dispensing device may be securely anchored with respect to the bars or wires of a conventional cage, whether said cage has horizontal or vertical elements, or both.

The hopper after filling is desirably closed by a cover 31 which may be pivoted at 32 so as to be swingable from open position to that illustrated in FIGURE 1. When relying on gravity, there is a tendency for seed in said hopper to clog at the exit 14, through which the seed is to flow to the trough 25, such an exit being a critical part or bottle neck of the feeder. In accordance with my invention, I overcome this trouble by the use of an agitator 33, desirably generally conical or pointed at its upper end and passing thru a hole 34 in the bottom wall of the hopper. This agitator is formed to be operated by a rod 35, slidable or reciprocable along the bottom wall 24 of the hopper, as shown most clearly in FIGURE 1. By virtue of such, its movement is not interfered with by elements of the cage 15, as might be the case if it oscillated transversely. The hopper-adjacent end of the rod 35, or that end outside of the cage 15, is pivoted to the lower end of the agitator 33, as indicated at 36, so that when the rod 35 moves back and forth, the agitator 33 pivots about its point of engagement with the lower wall 23, that is, about the edge thereof defining the hole 34. The pivot pin 36 desirably passes through registering apertures in bifurcations 40, on the end portion of the rod 35 which lies beneath the hopper 13, and the lower end portion of the agitator 33 therebetween.

The rod 35 is normally kept in its rightmost position, as viewed in FIGURE 1, that is, in a position forward or farthest from the sloping wall 22 of the hopper, by means of a desirably coiled spring 37. Said spring 37 and the engaged end portion of the rod 35 are guided in their proper path and supported by a plate 38, normally overlying the same and secured to the hopper by any desired means. From the position of the agitator 33, as viewed in FIGURE 1, it will be seen that on the rearward or leftward movement of its upper portion to the full line position, it breaks up any clogging of the seed and takes a position at a most advantageous point to act as a barrier so that the seed or the like flows freely therearound as the weight and compactness is relieved.

Forward or rightward movement of the upper portion of the agitator 33 is effected against the action of the spring 37, by downward movement of the perch bar 39, or that from the full line position to the dotted line position of FIGURE 1. Said perch bar desirably carries a perch 41 on its front or free portion, so that a bird 16 may alight thereon and cause such downward movement about its pivotal connection 42 to the trough 25. This pivotal connection is desirably effected by a pair of lugs 43 depending from a flange or projection 44 on the front or end wall 45 of the trough 25, which flange and lugs form a socket in which the fulcrum of the perch bar 39 is received, with the pivot 42 passing through it and the lugs 43, and also act to prevent hulls and debris from falling between the lugs causing the perch bar to become inactive.

It will be seen that this perch bar 39 is, in effect, a bell crank lever which changes generally vertical motion imparted by the bird 16, to motion of the lower lip 46 thereof in a substantially horizontal direction. This lower lip 46 underlies the adjacent end of said rod 35 which engages the perch bar 39 as a stop above said lip, so as to assist in holding the agitator 33 upright and so that said bar 35 is not only held against dropping from the trough, but is moved rearwardly or to the left as the perch bar 39 moves clockwise about its pivot 42, and forwardly or to the right as the perch bar 39 is released by the bird 16 and moved by the spring 37 counterclockwise about said pivot.

The trough 25, as viewed most clearly in FIGURE 5, will be seen to be foraminous or have small holes 47 for allowing the escape of small particles, while not allowing the bird seeds to pass therethrough. The lower wall 24 of said trough is here formed with a downwardly-opening groove 48 to receive the bar 35. An alternative to this construction is illustrated in FIGURE 6, where the trough 25' has a lower wall 24' formed with an upwardly-opening groove 48' to receive an operating rod 35'. It will, therefore, be seen that the rod 35, although shown below the trough in FIGURE 1, may, if desired, extend above the trough, pass through an aperture in the wall 45 thereof, and engage the agitator 33 above its lower end and above the lower wall 23 of the hopper.

In such a case, the agitator 33 will be pivoted above its lower end to the corresponding end of the rod 35' and have its lower end pass through the hole in the lower wall 23 of the hopper and be urged to the dotted line position by a spring acting toward the left, rather than toward the right, so that when the rod 35' is moved toward the left it will cause said agitator to rotate in a direction reverse to that which it causes it to rotate in the embodiment of FIGURES 1 to 5, inclusive.

Having now described the invention in detail in accordance with the requirements of the patent statutes, those skilled in this art will have no difficulty in making changes and modifications in the individual parts or their relative assembly in order to meet specific requirements or conditions. Such changes and modifiiations may be made without departing from the scope and spirit of the invention, as set forth in the following claims.

I claim:

1. A feed hopper and dispensing device comprising a bottom wall and side walls forming a container for feed to be dispensed, a normally vertical one of said side walls being formed with a feed exit, a trough formed by a bottom wall and side walls secured to said normally vertical wall framing the bottom and sides of said exit and projecting diagonally downward therefrom, said trough being open at the top to afford access to said feed, a hole in the bottom wall of said container, an agitator extending through said hole and oscillative about an edge defining the same, an operating rod for said agitator slidable along the bottom walls of said trough and container, means pivoting said agitator to said rod, a spring acting to hold said agitator in one position, and means to move said rod to cause pivoting of said agitator against the action of said spring.

2. The invention as recited in claim 1, wherein said rod lies below said trough, and the spring acts therethrough on said agitator.

3. The invention as recited in claim 1, wherein the wall with said exit has a hook adjacent its upper edge for supporting the container from an element of a cage.

4. The invention as recited in claim 1, wherein the means pivoting is a pin connecting the lower portion of the agitator and the adjacent portion of the rod.

5. The invention as recited in claim 1, wherein the means to move the rod comprises a bar pivoted to the end portion of the trough remote from the container.

6. The invention as recited in claim 1, wherein the means to move rod is pivoted and has a portion therebelow engaging the adjacent end of the operating rod, to cause said rod to be moved against the force of its spring upon depressing the free end of said means.

7. The invention as recited in claim 1, wherein the rod has its agitator-adjacent end bifurcated to straddle the lower portion of said agitator, and the means connecting said agitator and rod is a pin passing through both the said members.

8. The invention as recited in claim 1, wherein the lower wall of the trough has small holes to screen debris from the seed as it is fed therealong.

9. The invention as recited in claim 1, wherein there is a groove in the lower wall of the trough in which said operating rod is slidable.

10. The invention as recited in claim 1, wherein there are lugs at the free end of the trough between which the means to move the rod, in the form of a bell crank lever, is received and pivoted, the lower end of said lever engaging said rod to move it against the action of its spring.

11. The invention as recited in claim 10, wherein there is a perch mounted on the free end of the bell crank lever for holding a bird during its feeding.

12. A feed hopper and dispensing device comprising a bottom wall and side walls forming a container for feed to be dispensed, means for supporting said container, a normally vertical one of said side walls being formed with a feed exit, a trough formed by a bottom wall and side walls secured to said normally vertical wall, framing the bottom and sides of said exit, and projecting diagonally downward therefrom, said trough being open at the top to afford access to said feed, a hole in the bottom wall of said container, an agitator extending through said hole and oscillative about the edge defining the same, an operating rod for said agitator slidable along the bottom walls of said trough and container, pivot means connecting the lower portion of said agitator and the adjacent portion of said rod, a spring acting against the end of said rod which is adjacent the bottom wall of said container, and a bar pivoted to the end portion of said trough remote from said container, a portion of said bar below the pivoted portion engaging the adjacent end of said rod, whereby depression of the free end of said bar causes said rod to be moved toward the container, against the action of said spring, to oscillate the agitator.

References Cited in the file of this patent

UNITED STATES PATENTS 2,773,474   Dodds _____ Dec. 11, 1956